(12) United States Patent
Brewer

(10) Patent No.: US 9,069,458 B2
(45) Date of Patent: Jun. 30, 2015

(54) KID MODE USER INTERFACE WITH APPLICATION-SPECIFIC CONFIGURABILITY

(71) Applicant: barnesandnoble.com llc, New York, NY (US)

(72) Inventor: Dale J. Brewer, San Marcos, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 98 days.

(21) Appl. No.: 13/895,747

(22) Filed: May 16, 2013

(65) Prior Publication Data
US 2014/0344951 A1    Nov. 20, 2014

(51) Int. Cl.
*H04L 9/32*        (2006.01)
*G06F 3/0488*      (2013.01)
*G06F 21/62*       (2013.01)
*G06F 3/0481*      (2013.01)

(52) U.S. Cl.
CPC .............. *G06F 3/0488* (2013.01); *G06F 21/62* (2013.01); *G06F 3/04817* (2013.01)

(58) Field of Classification Search
CPC ....... G06F 21/10; G06F 21/121; G06F 21/31; G06F 21/316; G06F 21/53; G06F 21/54; G06F 3/0488; G06F 21/62; G06F 21/04817
USPC ........ 726/26–30; 713/182; 715/700, 707, 789
See application file for complete search history.

(56) References Cited

U.S. PATENT DOCUMENTS

| 6,882,299 | B1* | 4/2005 | Allport ........................ 341/176 |
| 8,230,515 | B1* | 7/2012 | Brewton et al. ................ 726/27 |
| 8,542,209 | B2* | 9/2013 | Lim ............................. 345/173 |
| 2013/0254660 | A1* | 9/2013 | Fujioka ........................ 715/707 |

OTHER PUBLICATIONS

Kid's Corner—Windows Phone Central Forums, http://forums.wpcentral.com/windows-phone-8/199077-kids-corner.html., 6 pages, printed from the Internet Aug. 15, 2013.

* cited by examiner

*Primary Examiner* — Hosuk Song
(74) *Attorney, Agent, or Firm* — Finch & Maloney PLLC

(57) ABSTRACT

A user interface is disclosed that is configured to provide a multi-user, multi-application experience for users of a given computing device, where each user account of the device is configurable with applications suitable for that user and each application has a usage timer associated therewith. Thus, each user may have access to applications that are different from another user of that device, and each user can be allocated application usage time independent from other users. The usage timers can be configured to reset once a usage period has lapsed. In some cases, the size of icons displayed for a given user account are automatically sized based on the age range of that user. A reward program may automatically increase the time allotted for given applications/content upon successful usage/consumption of educational applications/content. In a classroom/group setting, multiple computing devices may be simultaneously set into Kid Mode by a master computing device.

19 Claims, 10 Drawing Sheets

KID MODE USER INTERFACE WITH APPLICATION-SPECIFIC CONFIGURABILITY

FIELD OF THE DISCLOSURE

This disclosure relates to electronic display devices, and more particularly, to user interface techniques for interacting with touch sensitive devices.

BACKGROUND

Electronic devices such as tablets, e-readers, mobile telephones, smartphones and personal digital assistants (PDAs) are commonly shared between multiple users, such as parents sharing the device with their children. Currently, a mode exists for a parent to enable a child mode for an electronic device having games, applications ("apps"), music or videos, allowing the parent to select the appropriate games, apps, music or videos for the child's use. When the device enters the child mode, only those games, apps, music or videos selected are available for the child to use.

DETAILED DESCRIPTION

Figure 1:
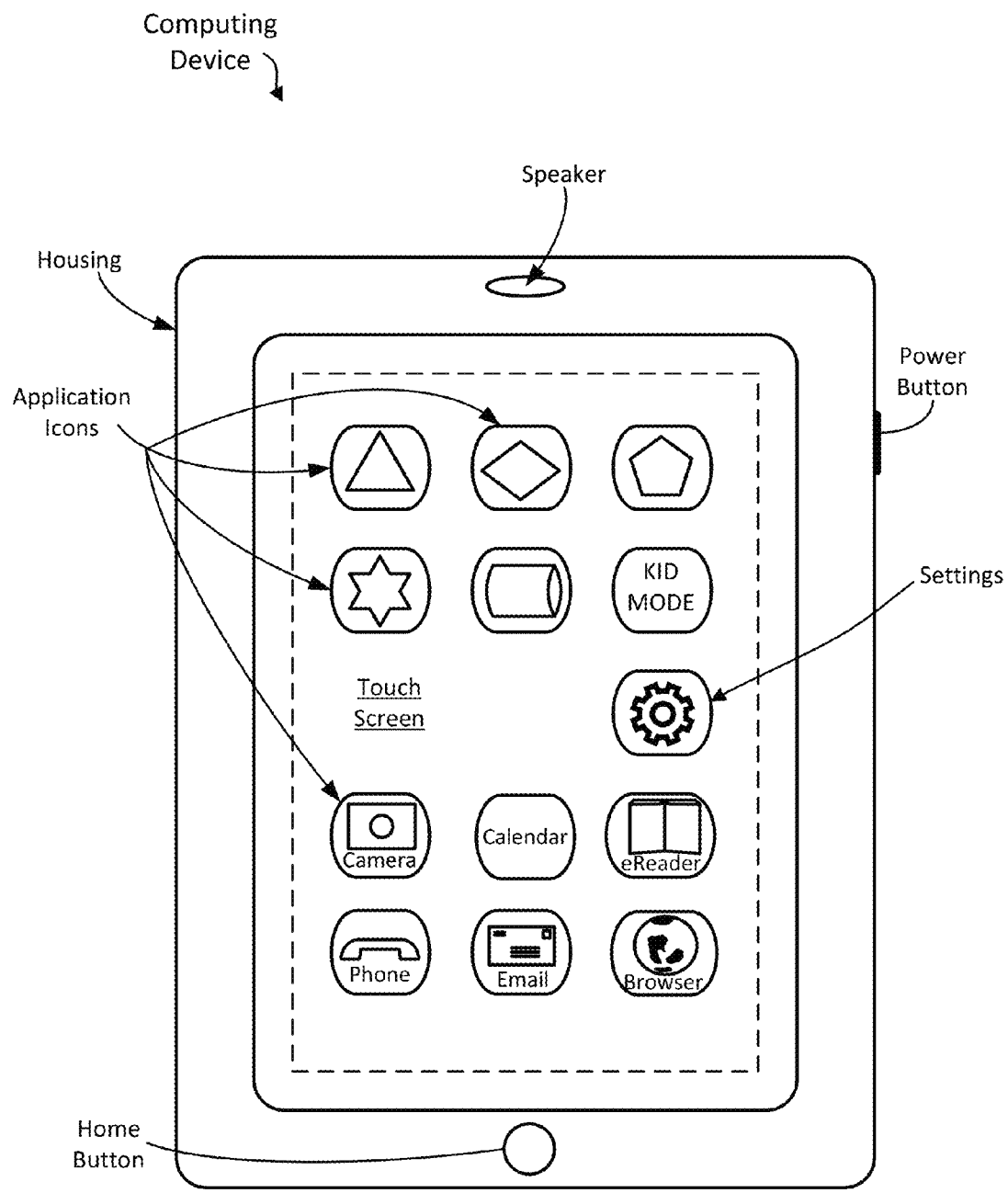
FIG. 1 illustrates an example computing device having a Kid Mode configured in accordance with an example embodiment of the present invention.

A computing device user interface is disclosed that is configured for use by children. The user interface is generally referred to herein as Kid Mode, and may be part of an overall user interface or the primary user interface of a given device. In one particular embodiment, the Kid Mode is configured to provide a multi-user, multi-application experience for children users of a given computing device, where each particular child-user account of the device is configurable with applications suitable for that particular child and each application has a usage timer associated therewith. Thus, each child-user of a given device may have access to applications that are different from another child-user of that device, and each child-user of that device can be allocated application usage time independent from other child-users with respect to each application. The usage timers can be configured to reset once a usage period has lapsed (e.g., on a daily or weekly basis). In some cases, the size of the application icons displayed for a given child-user account are automatically sized based on the age range of that child-user. In some cases, the Kid Mode is configured with a reward program that may automatically increase the time allotted for a given application (such as a game or video or social media channel) upon successful usage or consumption of educational applications and/or content. In a classroom or group setting, multiple computing devices may be simultaneously configured and set into Kid Mode by a control signal sent from a master computing device. In some cases, a parent or guardian computing device can remotely monitor timer statuses and other attributes of a child's computing device operating in Kid Mode. The terms parent, guardian, child, and kid are heavily used herein for purposes of discussion, but the disclosed techniques are perfectly suitable for other care giving contexts as well, as will be appreciated, such as or babysitter (instead of parent or guardian) or student (instead of child or kid).

General Overview

As previously explained, some computing device user interface applications that are currently available allow a parent to enable a child mode for an electronic device having games, applications, music or videos, and access to other such content. In such applications, the parent can select the appropriate games, applications, music or videos that can be used in that mode. When the device enters the child mode, only those games, apps, music or videos selected are available for the child to use. There are a number of short-comings associated with such child modes. For instance, the parent has no ability to differentiate between different child-users. Nor can the parent differentiate application usage time from one child to another, or distinguish the look and feel of the mode based on the child's age. Moreover, such conventional child modes may tend to feel more punitive in nature (from the child's perspective) and fail to reward or otherwise recognize when a child has used the device in an educational or otherwise admirable manner.

Thus, and in accordance with an embodiment of the present invention, a Kid Mode user interface is disclosed that is specifically configured to allow parents to better control how a child or multiple children use a given computing device. The Kid Mode can be configured to provide a multi-user, multi-application experience, so that not only can each child-user have a user account on a given computing device, each child-user account can provide access to applications independent of other child-user accounts on that device. In some such embodiments, each particular child-user account of the device is configurable with applications suitable for that particular child, and each application has a usage timer associated therewith. Thus, each child-user account of the device may provide access to applications that are different from applications made available by the parent in another child-user account of that device. Further note that the parent or guardian can quickly switch from one child-user account to another, as needed. In addition, each child-user of the computing device can be allocated application usage time independent from other child-users of that device, and with respect to each application made available to that child by the parent.

The usage timers can be periodically configured to reset once a usage period has lapsed. For instance, any one application-specific timer may be parent-configured to reset on a daily or weekly basis, depending on the nature of the corresponding application. In addition, an overall usage timer can be deployed, so as to provide a multi-level timing control. For instance, in a given week, a parent may wish to allocate an overall total of 3 hours of usage time. In addition, the parent may further wish to limit any one day of usage during that week to 30 minutes or less, wherein once a 30 minute daily usage period has lapsed, the Kid Mode blocks or otherwise limits further usage of the device as desired by the parent (e.g., device locks out usage of all games and video for remainder of day, and limits telephone, texting, and email applications to only communicating with parent). In one such example embodiment, educational content and/or applications may remain accessible, if so desired. To this end, the application-specific timers of the Kid Mode can be used by the parent to encourage consumption of so-called preferred applications/content that are perceived to be better for a particular child. In general, educational content and applications are those perceived to give knowledge or positive instruction or otherwise reflect or encourage positive behavior, such as an e-reader application or an eBook that indicates advanced reading ability for a child at a specific age, a spelling application, a mathematical or scientific application, a vocabulary-building application, or other such applications.

In some embodiments, the size of the application icons displayed for a given child-user account are automatically sized based on the age range of that child-user. For example, the parent can program into the user account of a given child information about that child such as birthday, color preferences, reading ability, identifiable characters the child enjoys, and/or any other particular child preferences or traits (e.g., maturity level according to standardized child behavior metrics or other user-defined criteria or hardcoded criteria acceptable to the parent). The Kid Mode can provide icon sizes and colors as well as content/application access in accordance with that information. In one specific example such case, the Kid Mode can be configured to acknowledge a child's birthday with a special greeting on that day, followed by an explanation as to how Kid Mode has been automatically reconfigured on account of the child's substantial increase in reading level or maturity level (e.g., as established by the parent and/or acceptable metrics), which may provide a bit of fun for the child. For instance, the child may be informed that she/he now has access to the next level of 'big kid' apps and content, and any increased usage times can be highlighted along with suggested reading materials that the child may enjoy. In some such cases, the parent can customize the information and changes provided to the child, as will be appreciated in light of this disclosure.

In still other embodiments, the Kid Mode is configured with a reward program that may automatically increase the time allocated for a given application upon successful usage or consumption of educational applications and/or content. For example, while a parent may desire to limit access to more trivial content/applications such as games or videos or social media channels and/or potential time-wasters such as telephone, texting, and email applications, the parent may be less concerned with content and applications designed to be educational or otherwise create a positive learning experience for the child. To this end, the Kid Mode can be configured to actively monitor usage of such educational applications and content, and to increase application-specific timers associated with more trivial content/applications when appropriate to do so (as defined by parent). In one such embodiment, the Kid Mode is configured to allow the parent to set both the required usage time of educational content/applications before such a reward is given, as well as the amount of the reward. The Kid Mode may be configured to confirm the child's active participation with preferred educational content/applications by, for example, monitoring frequency of screen taps or other instances of user input as well as the type of user input (e.g., page turns of parent-approved eBooks, browsing clicks on parent-approved websites), so as to discreetly and effectively proctor the child's usage of the device.

In a classroom or group setting, multiple computing devices may be simultaneously configured and set into Kid Mode by control signal(s) sent from a master device. In such an embodiment, the Kid Mode of the various devices can be programmed to allow the teacher (or parent or other guardian, as the case may be) to establish a communication channel between the child's device and the teacher's device. In such cases, each child-user device can be associated with a configuration file pre-established by the master device, and that configuration file can be communicated to the corresponding device over the communication channel. Multiple devices can be simultaneously configured in this manner. This communication channel may be established, for example, over a wireless local area network where the children and teacher are in the same room or building, or over a wide area network where respective computing devices are communicatively coupled to one another via a communication network such as the Internet. Any number of suitable communication protocols and technologies can be used to establish such a communication link. Such a configuration would allow for cloud-based educational services, for instance. Note that such a communication link could also be used by the parent for monitoring purposes. In particular, the parent computing device can remotely connect with the child device to monitor timer statuses and other attributes of the child's computing device operating in Kid Mode. Numerous other such communication link based use-cases will be apparent in light of this disclosure.

System Architecture

FIG. 1 illustrates an example computing device having a Kid Mode configured in accordance with an example embodiment of the present invention. The device could be, for example, a tablet such as the NOOK® tablet or eReader by Barnes & Noble. In a more general sense, the device may generally be any computing system having the capability for displaying content to a user, such as a desktop computing system, a mobile computing device such as a mobile phone or laptop or tablet, a smart television, a smart display screen, or any other device having a touch screen display or a non-touch display screen and that can be used in conjunction with a user interface as variously provided herein. As will be appreciated in light of this disclosure, the claimed invention is not intended to be limited to any particular kind or type of electronic device.

As can be seen with this example configuration, the device comprises a housing that includes a number of hardware features such as a power button, a speaker, and a press-button (generally referred to as a home button herein). A touch screen based user interface is also provided, which in this example embodiment includes a number of icons that can be selected to either launch a corresponding application or access a menu or other part of the user interface. In particular, this example case includes a camera application icon, a calendar application icon, an eReader application icon, a phone application icon, an email application icon, a browser application icon, and various others. In addition, the user interface allows the user to access a menu (or set of menus) that can be used to configure various aspects of the device via a Settings icon, as well as the Kid Mode as will be discussed in turn. As will be appreciated, the icons can be selected via an appropriately placed screen tap or any other selection of the corresponding icon (e.g., mouse click or trackpad click, etc, depending on the available user interface mechanisms).

Other embodiments may have fewer or additional such user interface (UI) features, or different UI features altogether, depending on the target application of the device. For instance, some embodiments may include a status bar displayed, for example, at the top of the display screen and which includes a number of icons (e.g., a night-light icon, a wireless network icon, and a book icon), a battery indicator, and a clock. In some such cases, tapping the book icon may provide bibliographic information on the currently displayed content or provide the main menu or table of contents for the book, movie, playlist, or other content. Other example hardware features may include, for instance, a volume control button, an audio jack, a microphone, a still camera, a video camera, to name a few common such features. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). The speaker can be used as typically done in the context of computing devices, such as for aurally presenting content (e.g., eBooks or online music) and for communications (e.g., speaker phone for). Other hardware features may be used as well, such as elongated press-bars that can be used, for example, to page forward (using a right-side press-bar) or to page backward (using a left-side press-bar), such as might be useful in an eReader application or to navigate other content currently displayed on the device. Numerous variations will be apparent, and the claimed invention is not intended to be limited to any particular set of hardware buttons or features, or device form factor.

In this example configuration, the home button is a physical press-button and can be used as follows, in accordance with one example embodiment: when the device is awake and in use, tapping the button will display a quick navigation menu, which is a toolbar that provides quick access to various features of the device. The home button may also be configured to cease an active function that is currently executing on the device, or close a configuration sub-menu that is currently open. In some such cases, for instance, the home button can be used to exit the Kid Mode, but may necessitate entry of a correct pass-code to complete the exit function (e.g., so a parent can effectively prohibit a child-user from exiting Kid Mode). The home button may further control other functionality. For instance, the user can press and hold the home button to engage a power conservation routine where the device is put to sleep or an otherwise lower power consumption mode. So, a user could grab the device by the button, press and keep holding as the device was stowed into a bag or purse. Thus, one physical gesture may safely put the device to sleep. In such an example embodiment, the home button may be associated with and control different and unrelated actions: 1) show a home screen or quick navigation menu; 2) exit a configuration sub-menu or currently active function/application; and 3) put the device to sleep.

As will be appreciated, the various UI control features, menus, and sub-menus displayable to the user can be implemented as touch screen controls in this example embodiment. Such UI screen controls can be programmed or otherwise configured using any number of conventional or custom technologies. In general, the touch screen display translates a touch (direct contact or otherwise sufficiently proximate contact) in a given location into an electrical signal which is then received and processed by the device's underlying operating system (OS) and circuitry (processor, etc.). In some instances, note that the user need not actually physically touch the touch screen to perform an action. For example, the touch screen display may be configured to detect input based on a finger or stylus hovering over the touch sensitive surface (e.g., within 3 inches of the touch screen, or otherwise sufficiently close so as to be detected). Additional example details of the underlying OS and circuitry in accordance with some embodiments will be discussed in turn with reference to FIG. 2a.

Figure 2A:
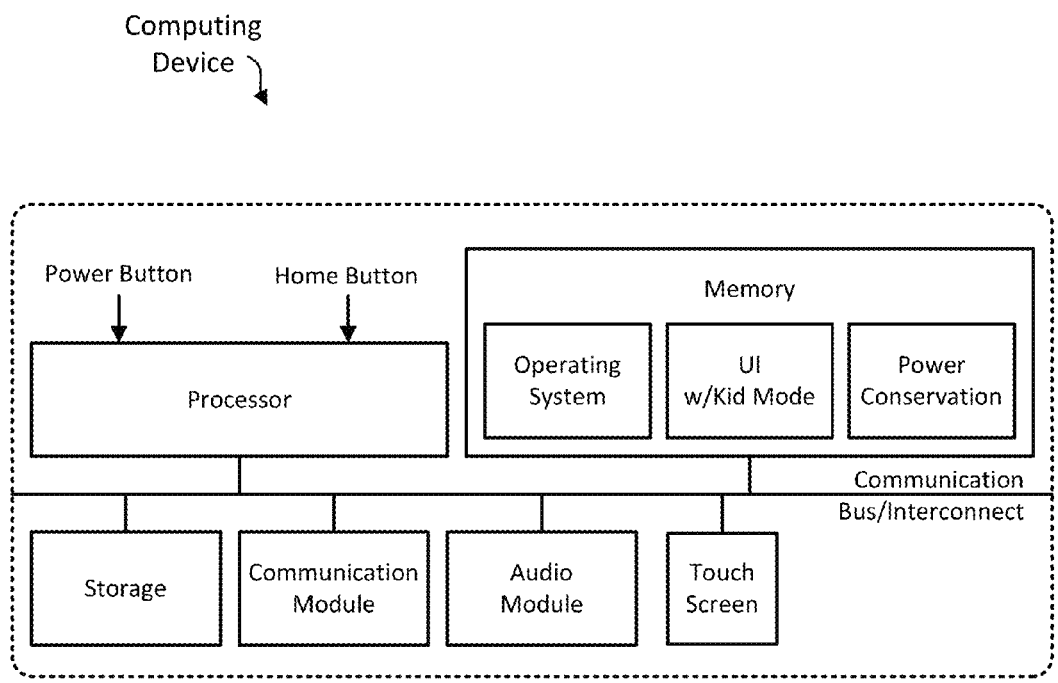
FIG. 2a illustrates a block diagram of a computing device configured in accordance with an embodiment of the present invention.

FIG. 2a illustrates a block diagram of a computing device configured in accordance with an embodiment of the present invention. As can be seen, in addition to the touch screen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the screen into an electronic signal that can be manipulated or otherwise used to trigger a specific user interface action, such as those provided herein. The principles provided herein equally apply to any such touch sensitive devices. For ease of description, examples are provided with touch screen technology. Other embodiments may be implemented without touch sensitive technology (e.g., mouse and keyboard based user input mechanism). To this end, the user interface techniques provided herein can be used with any suitable user interface mechanisms.

In this example embodiment, the memory includes a number of modules stored therein that can be accessed and executed by the processor (and/or a co-processor). The modules include an operating system (OS), a user interface (UI) configured with a Kid Mode, and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a color pattern unlock mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The touch screen display can be implemented, for example, with a 6-inch E-ink Pearl 800×600 pixel screen with Neonode® zForce® touchscreen, or any other suitable display and touchscreen interface technology. The communications module can be, for instance, any suitable 802.11b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The UI module configured with Kid Mode can be, for example, based on touchscreen technology and the various example screen shots and use-case scenarios shown in FIGS. 1, 3a-e, 4a-b, 5a-i, and FIG. 6, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
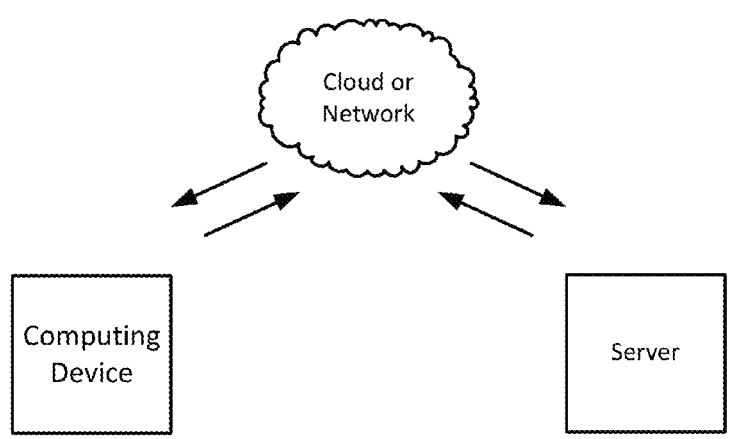
FIG. 2b is a block diagram illustrating a communication system that includes the computing device illustrated in FIG. 1, in accordance with an example embodiment of the present invention.

FIG. 2b illustrates a block diagram of a communication system configured in accordance with an embodiment of the present invention. As can be seen, the system generally includes a computing device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other suitable computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a Kid Mode as provided herein to the touch screen device (e.g., via JavaScript or other browser based technology). In other embodiments, portions of the Kid Mode methodology are executed on the server and other portions of the methodology are executed on the device. Numerous server-side/client-side execution schemes can be implemented to facilitate a Kid Mode in accordance with an embodiment, as will be apparent in light of this disclosure.

Kid Mode UI

Figure 3:
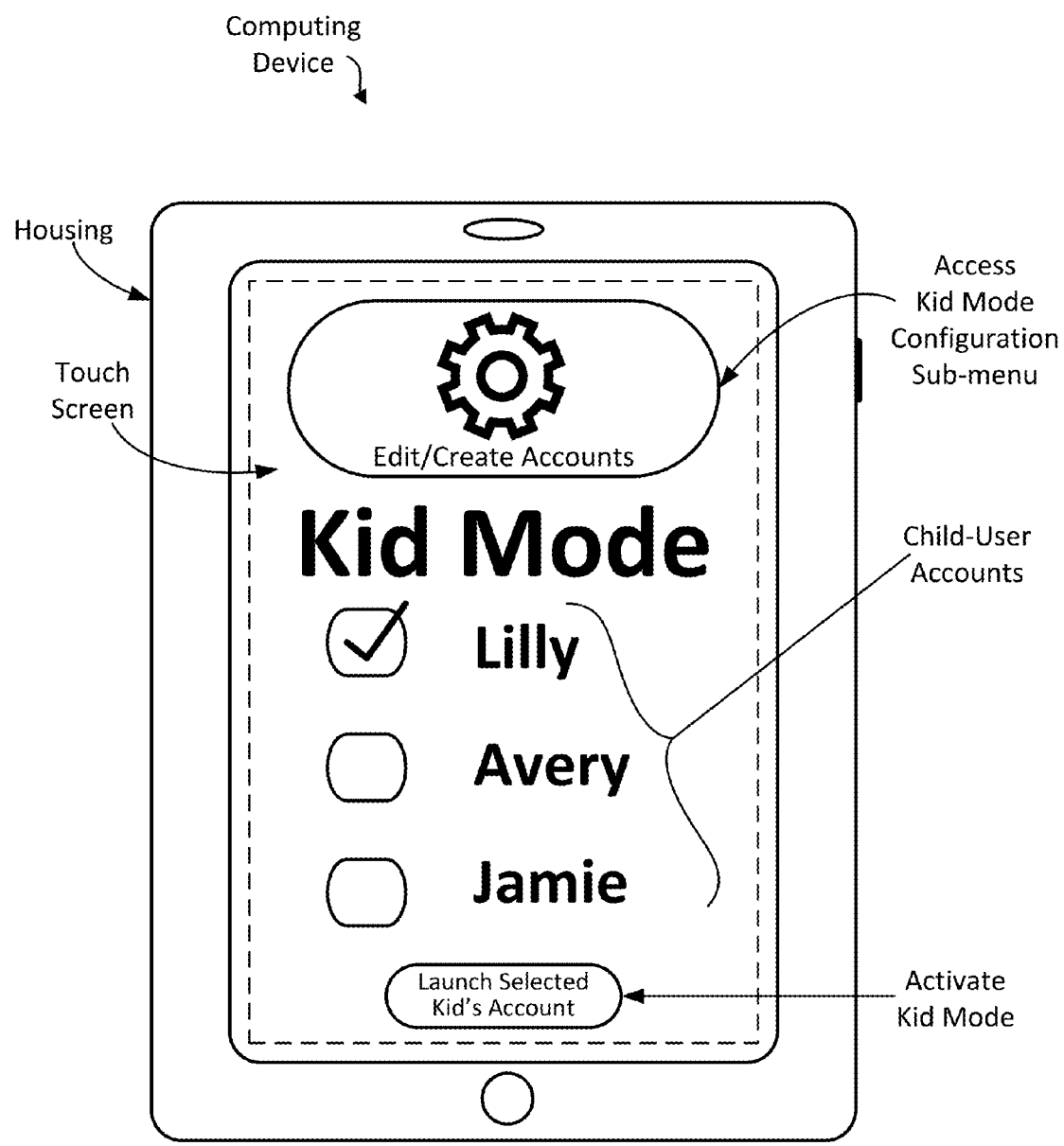
FIG. 3 illustrates a screenshot of an example Kid Mode main menu of a computing device, configured in accordance with an embodiment of the present invention.

FIG. 3 illustrates an example such Kid Mode main screen, configured in accordance with one embodiment. In particular, after the user (parent/guardian) selects the Kid Mode icon from the main user mode (as shown in FIG. 1), a Kid Mode main menu is presented to the user. As can be seen, this main menu allows the user perform a number of actions, including the ability to select an existing child-user account and launch the Kid Mode for that particular account. Once the computing device is in the target Kid Mode user account, the parent/guardian can then pass the device to the intended child-user. The Kid Mode main menu also allows the parent/guardian to edit existing child-user accounts and create new child-user accounts. In the embodiment shown, the parent/guardian can interact with the Kid Mode main menu via the touch screen using appropriately placed taps, but any other suitable user input mechanism can be used (e.g., mouse clicks, etc).

Figure 4A:
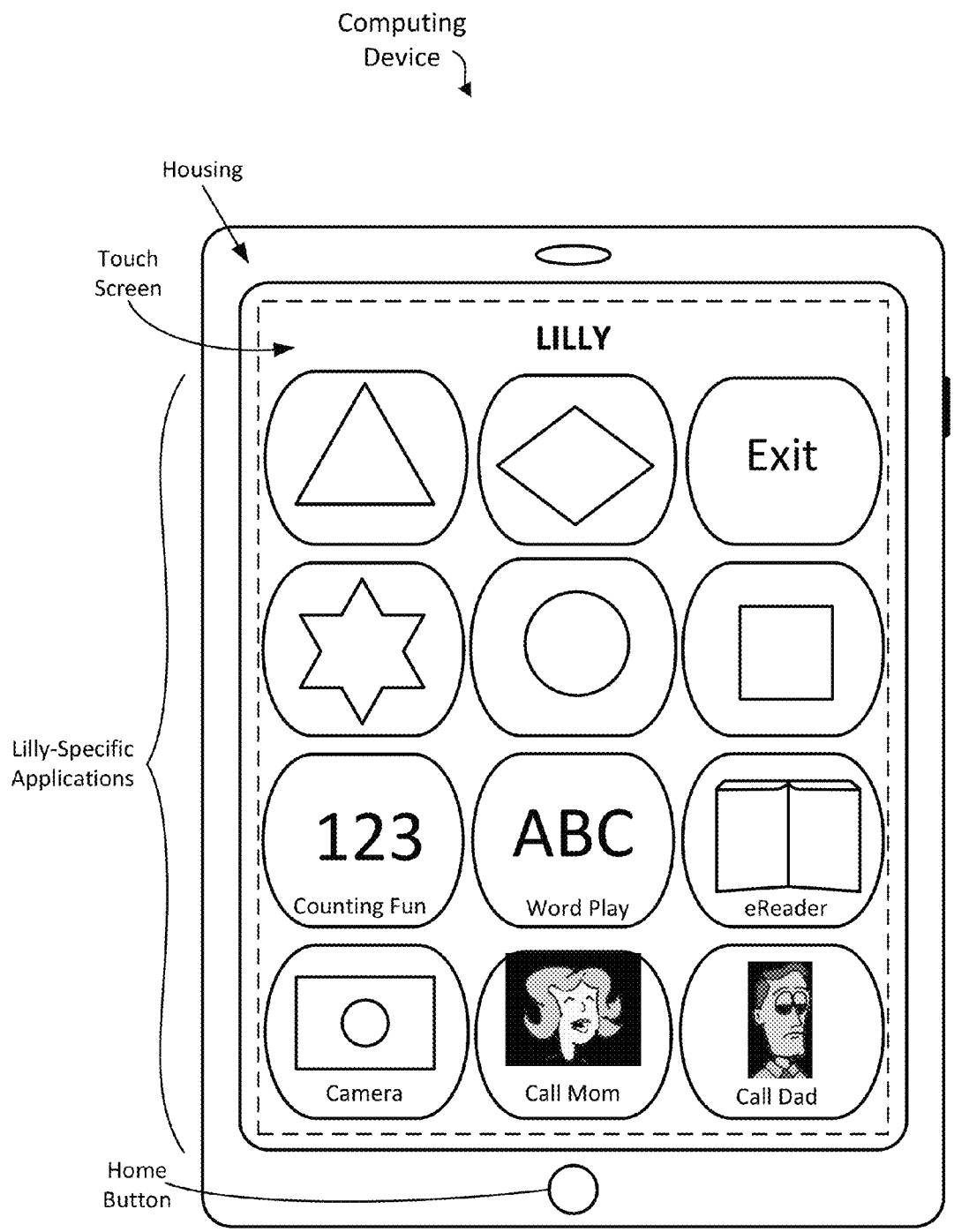
FIGS. 4a and 4b each illustrate a screenshot of a given computing device operating in a first child-user account and a second child-user account, respectively, and configured in accordance with an embodiment of the present invention.

With respect to launching an existing child-user account, the parent (or other supervising user) can check the appropriate UI box and then tap, click or otherwise select the 'Launch Selected Kid's Account' UI button. In response, the device is automatically reconfigured in accordance with that child-user account using the previously saved settings set-up for that account. For example, in the example scenario shown in FIG. 3, the child-user account for Lilly is checked, and the resulting configuration is shown in FIG. 4a. For purposes of discussion, assume Lilly is a 5 to 8 year old girl that likes reading eBooks and taking pictures, and that her parents are trying to encourage Lilly to develop her basic math skills and vocabulary.

As can be seen in FIG. 4a, the icons presented in Lilly's user mode (generally, Lilly's UI) are much larger relative to the icons presented in the normal user mode shown in FIG. 1. Additionally, a number of applications available in the normal user mode are not available in Lilly's UI. In particular, note that the browser application icon, telephone application icon, email application icon, and calendar application icon, are not presented in Lilly's UI, because they have effectively been disabled or otherwise not selected for Lilly's UI, as will be explained in turn. On the other hand, a number of applications have been enabled or otherwise selected for presentation in Lilly's UI, which are generally designated Lily-specific applications in FIG. 4a. These applications include a camera application, an eReader application, a math application (Counting Fun 123), a vocabulary building application (Word Play ABC), and several other age-appropriate applications including any parent-approved games. Selective access to content may also be provided. For instance, the URL to a parent-approved online game may be represented with one of the icons that is available via Lilly's UI, wherein when Lilly selects that particular icon, the Kid Mode is configured to cause the effectively hidden browser application of the computing device to launch and present that particular website only. Note that in some such example embodiments, the browser used in Kid Mode may be configured like any other browser, but may be further configured or controlled to block navigation away from the parent-approved page(s).

The Exit icon of Lilly's UI can be used to exit Lilly's mode and to return to the normal user mode shown in FIG. 1. Similarly, a press on the home button may also trigger exiting of the Kid Mode and return to the normal mode. Note, however, that a pass-code may be required to prevent Lilly from exiting Kid Mode. In this way, the exit function is only usable by Lilly's guardian. In one such embodiment, for example, in response to the Exit icon or home button being tapped, the Kid Mode is configured to present a pop-up window having pass-code entry box (or set of boxes, as the case may be) for receiving a 4-digit number or any other suitable pass-code. In any such cases, the exit function will complete only upon successful entry of the previously established pass-code. The pass-code can be set, for example, when creating the child-user account and can be updated by the guardian as desired/needed, as will be discussed in turn.

In addition, note that Lilly's UI does not provide access to the Settings icon (the Settings icon is present in the normal user mode shown in FIG. 1). Alternatively, the Settings icon can be presented, but pass-coded in a similar fashion to the Exit icon or otherwise configured with restricted or limited access. In addition, the example Kid Mode shown in FIG. 4a further shows that Lilly has limited access to the phone application, so that she may call her guardian (in this example case, Mom and Dad). Note the telephone icons will be readily recognizable to Lilly, as they include pictures of her mom and dad. In one such example embodiment, the Kid Mode is configured to, in response to Lilly having tapped one of the parent phone icons, engage an auto-dialing function to call that parents phone. In this example case, the Kid mode will not allow other phone numbers to be dialed. The telephone access and phone icon(s) can be set-up during creation or editing of the child-user account, as will be discussed in turn. Similar features can be configured for any communication medium, including voice calls and video calls.

Figure 4B:
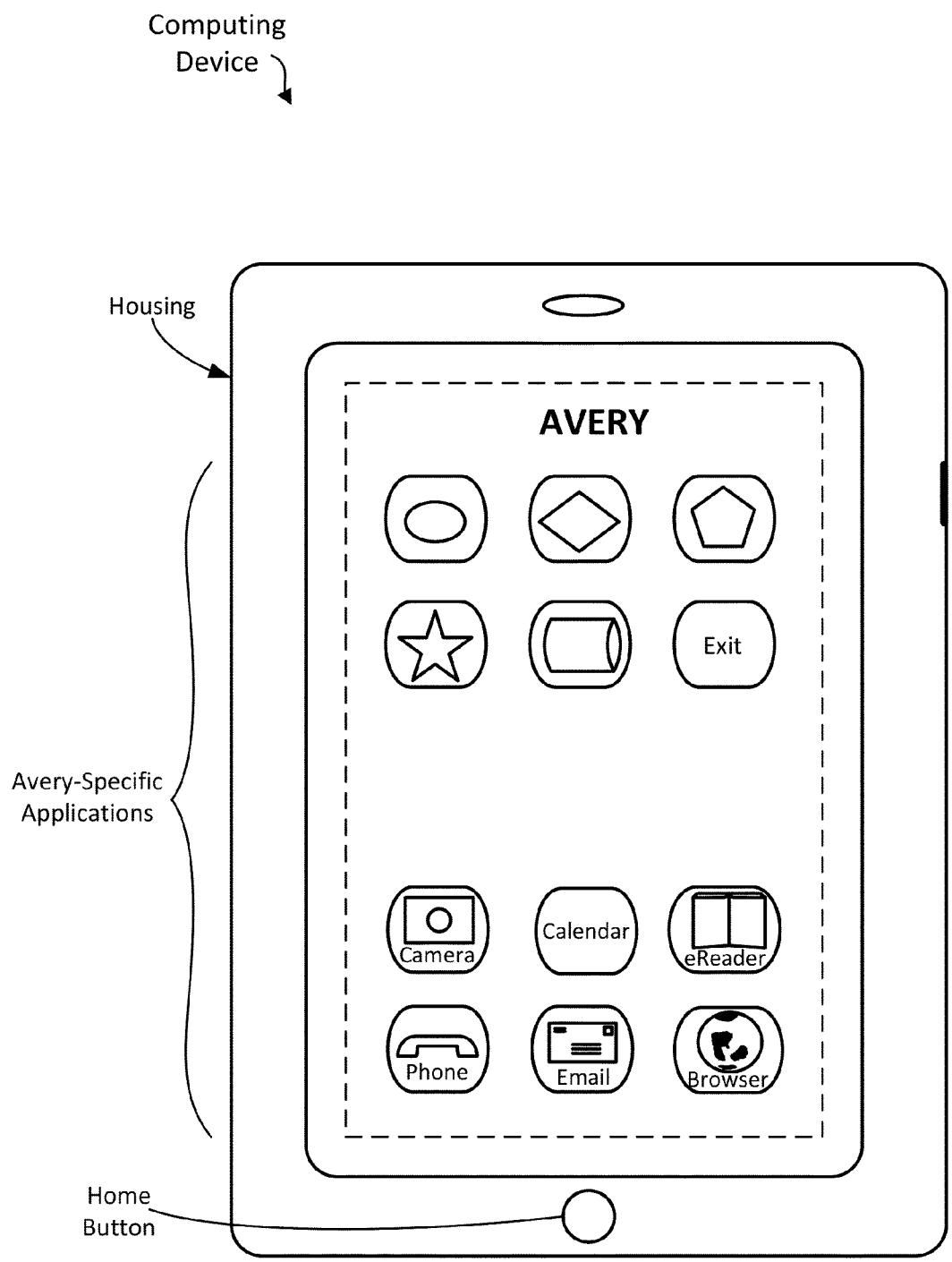

FIG. 4b shows another example child-user account (Avery) that can be configured on the same computing device as the one used by Lilly. For instance, assume Lilly has a big sister named Avery, who is 11 to 14 years old and likes playing online games and corresponding with her friends via texting, emails and phone, and that her parents are trying to encourage Avery to do less of all those things, while still allowing her a degree of autonomy and privilege. As will be appreciated in light of this disclosure, this user account can be launched in a similar fashion as described with respect to Lilly (e.g., by checking the box next to Avery's name on the main menu of the Kid Mode shown in FIG. 3 and selecting the 'Launch Selected Kid's Account' UI button).

As can be seen in FIG. 4b, the icons presented in Avery's UI are more like the icons shown in the normal mode shown in FIG. 1 or perhaps a bit larger, but are smaller relative to the icons presented in Lilly's UI shown in FIG. 4a. This size difference is attributable to the difference in age between Lilly and Avery, which the Kid Mode can automatically detect (e.g., based on data provided during set-up of child-user account) and then configure the icon sizes accordingly, in accordance with an embodiment. In addition, further note that Avery has access to a number of applications (generally designated Avery-specific applications) that are not available in Lilly's UI on that same computing device. In particular, Avery's UI includes icons for the following applications: browser, telephone, email, and calendar. As will be appreciated in light of this disclosure, however, the time allocated for Avery's use of these applications can be limited or otherwise controlled as desired, and as will be explained in turn. The Exit and Settings icons for Avery's UI can be configured in a similar fashion to Lilly's UI, and that that relevant discussion is equally applicable here.

Creating/Editing Kid Mode User Accounts

As previously explained, a parent or guardian of a child can configure the Kid Mode as desired, depending on the particular child-user and various factors that might be considered by the parent/guardian, in accordance with an embodiment of the present invention. To this end, the parent/guardian can access a Kid Mode configuration sub-menu (or set of sub-menus) in various ways. Example configuration sub-menus are shown in FIGS. 5a-h, each of which will be discussed in turn. Note that a Back arrow button may be provided on the sub-menus to allow for navigating the menu hierarchy, and a Save button may be provided to allow user configuration inputs to be stored on the computing device. Other such features will be apparent in light of this disclosure.

Figure 5A:
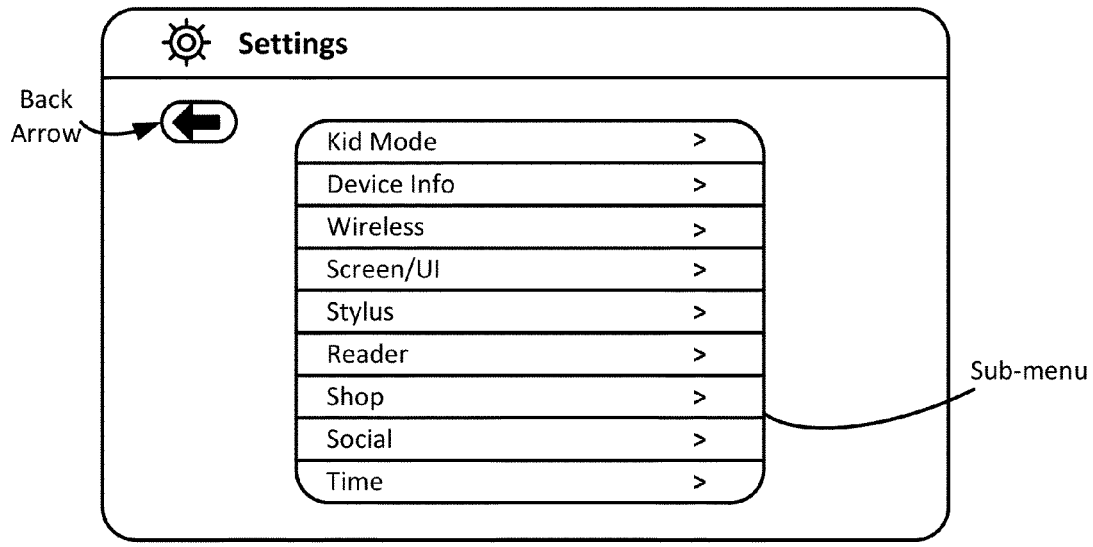
FIG. 5a-5h illustrate example Kid Mode configuration screen shots of the user interface of a computing device configured in accordance with an embodiment of the present invention.

In accordance with one example embodiment, the Kid Mode configuration sub-menu scheme can be accessed by tapping the Settings icon on the normal mode main screen (FIG. 1), which causes the device to display the general sub-menu shown in FIG. 5a. From this general sub-menu the user can select any one of a number of options, including one designated Kid Mode in this specific example case. Selecting this sub-menu item (with an appropriately placed screen tap) causes the Kid Mode configuration sub-menu of FIG. 5b to be displayed, in accordance with an embodiment. The user may also access the Kid Mode configuration sub-menu scheme by tapping the Edit/Create Accounts icon on the main page of Kid Mode (FIG. 3), which also causes the device to display the Kid Mode configuration sub-menu of FIG. 5b. Any number of such menu schemes and nested hierarchies can be used, as will be appreciated in light of this disclosure.

Figure 5B:
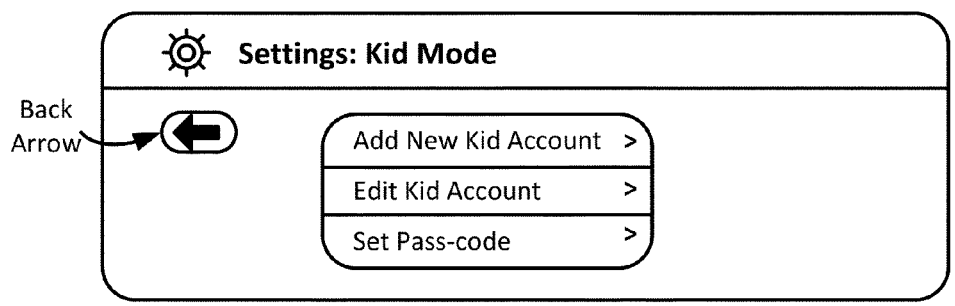

As can be seen, once the Kid Mode configuration sub-menu of FIG. 5b is presented, the user has a number of options including: Add New Kid Account, Edit Kid Account, and Set Pass-code. As previously explained, the Set Pass-code option can be selected to allow the user to set-up a pass-code for exiting Kid Mode or otherwise securing access to restricted applications and content. A set of security question-answers can be set-up as well, in case the pass-code is forgotten. Thus, the guardian can be presented with screens to enter the established pass-code or to answer various security questions. Alternatively, or in addition to, an override can be hardcoded into the Kid Mode. An example override might be, for instance, a press-and-hold on the home key for 15-20 seconds, followed by five additional press-and-release actions on the home button within the next 10 seconds. Numerous other such user-configurable and/or hard-coded security mechanisms can be used to ensure a given child-user account is not improperly exited, as will be appreciated in light of this disclosure.

The Add New Kid Account sub-menu option shown in FIG. 5b can be selected to add a new child-user account, wherein the guardian is prompted to enter information such as the name, birthday, and favorite color(s) of the child for which the account is being created. In addition, the user creating the new child-user account can be prompted to select features that will be operable or otherwise available when that account is activated on the device. Example features include applications that will be accessible in the child UI, usage-time allocated to the applications, usage-period for which usage-time is allocated, Internet access, kid rewards (such as increased usage-times for a kid-preferred application when kid has amply used a parent-preferred application), remote monitoring of device (by way of a periodically emailed report indicating application-usage and content-consumption statistics), sound capability (e.g., via speak and/or headphone jack), communications access (e.g., phone, email, texting), and/or remote control capability (e.g., group or teaching mode).

Figure 5C:
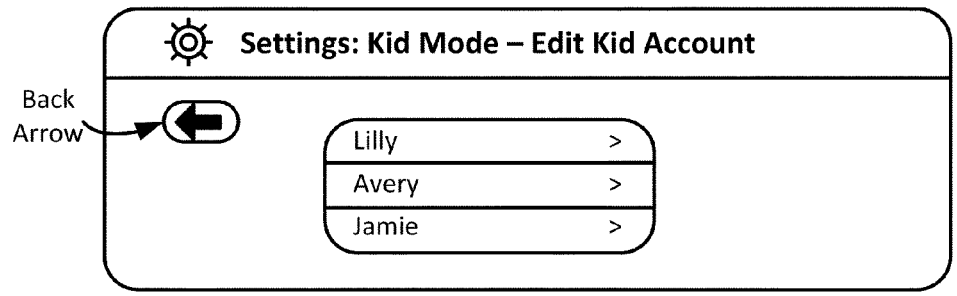

With respect to editing existing accounts, the guardian can select the Edit Kid Account sub-menu option shown in FIG. 5b, which will cause the Edit Kid Account sub-menu of FIG. 5c to be presented. The guardian can then select the target child-user account to be edited, which will in turn allow that guardian to review various sub-menu screens similar to those presented when creating a new account. To this end, note that FIGS. 5d-h illustrate example sub-menu screens presented in the context of editing of a previously created child-user account, but similar sub-menu screens can be presented to the user when creating the child-user account as well, except that the user will be providing data in the various menu options rather than reviewing/updating data.

Figure 5D:
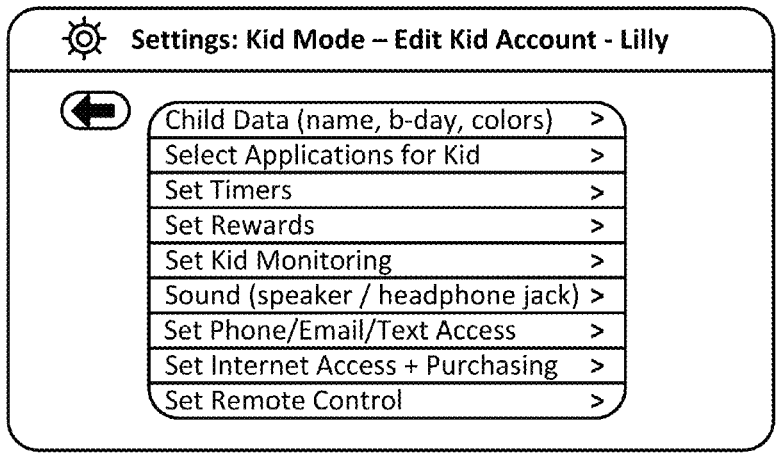

FIG. 5d illustrates an example Edit Kid Account sub-menu screen for Lilly, in accordance with an embodiment. As can be seen, the first sub-menu option includes Child Data, which includes the child's name, birthday, and favorite color(s) in this example case. As previously explained, this information will allow the Kid Mode to provide icon sizes based on the age of the child as well as a UI color scheme that would be desirable to the child. For instance, the UI background and menus can default to the designated favorite colors, icons can be highlighted with a favorite color, and font/text can default to a favorite color. Table 1 shows an example correlation of age to icon size, in accordance with one specific such example embodiment.

TABLE 1

Correlation of Age Range to Size

| Age Range | Icon Size (pixels) |
|---|---|
| over 17 | 16 × 16, 32 × 32 |
| 13-17 | 48 × 48 |
| 10-13 | 96 × 96 |
| 8-10 | 256 × 256 |
| under 8 | 512 × 512 |

Themed icons can replace the standard or 'normally used' icons, such as character-based icons wherein each icon depicts a character from a book or movie that child has enjoyed. Of course, copyrights of such character images and other protected content can be respected in accordance with standard or otherwise suitable digital rights management techniques (e.g., purchased icons or otherwise properly acquired and licensed icon usage). Alternatively, digital pictures of family members and/or friends can be converted to icons. Numerous other customizations can be used to provide a desired look-and-feel to the UI of the child-user account, as will be appreciated in light of this disclosure.

The next sub-menu option of FIG. 5d includes Select Applications for Kid, which allows the guardian to select which applications, if any, will be available via that child-user account. In one embodiment, upon selection of this menu option, the user can be presented with a master list of applications available on that device, wherein each listed application is associated with a check box. The user can check the desired applications, and the Kid Mode can be configured to hide all unselected applications (no icon will be shown on child-user UI). Any number of other suitable application selection mechanisms can be used. As will be appreciated in light of this disclosures, a selected application can still be associated with restrictions, such as usage-time (e.g., application can only be used 15 minutes per day), access time (e.g., application can only be used from 7 pm-7:15 pm), and usage-purpose (e.g., browser can only be used to access designated websites). Such application restrictions can be configured via other sub-menu options of the Kid Mode, in accordance with an example embodiment and as will be discussed in turn.

Figure 5E:
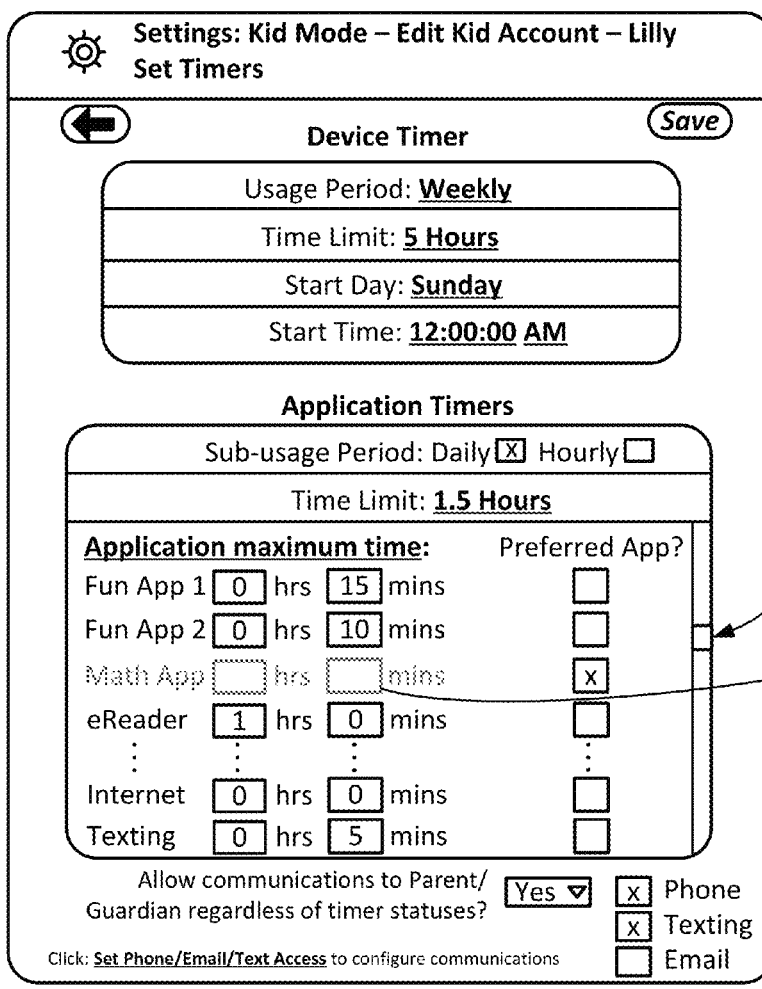

The next sub-menu option of FIG. 5d includes Set Timers, which allows the guardian to designate usage times and access times for each of the selected applications. FIG. 5e show an example sub-menu that can be provided to the guardian in response to the Set Timers menu option of FIG. 5d being selected. As can be seen in this example embodiment, the guardian can designate both an overall device timer as well as one or more application timers. The device timer can be used to establish a usage-period in which the individual application timers are allowed to run. Once the individual application timers have run out, they can only be reset at the beginning of the new usage-period. In this example case shown in FIG. 5e, the usage-period is set to weekly and an overall usage-time of the computing device for the child-user (Lilly, in this example case) is 5 hours. The usage-period runs from Sunday to Saturday, commencing at 12 am Sunday each week. Other usage periods can be set as desired (e.g., bi-weekly, monthly, etc), as can usage access (e.g., only allow use of computing device on Wednesday, Friday and Saturday and/or only from 7 pm to 7:30 pm).

As can be further seen in the example sub-menu shown in FIG. 5e, the application timers section can be used to set a sub-usage period that operates within the overall usage-period set in the device timer section. In this example case, the sub-usage period runs on a daily basis and an overall sub-usage-time is 1.5 hours. Thus, in this example case, the intended child-user Lilly can use the computing device for a total of up to 1.5 hours per day and up to 5 hours in a given week. Once these timers run out, the computing device will not be useable by Lilly until either the next day or the next week, depending on whether the sub-usage period timer or the overall usage-timer period has run.

As can be further seen in the example sub-menu shown in FIG. 5e, the application timers section allows Lilly's guardian to set the maximum usage times for each application, and independent of other applications. In one such embodiment, the Kid Mode is configured to populate this section of the sub-menu with applications that are selected in the Select Applications for Kid sub-menu, as previously discussed. In other embodiments, all the applications available on the device can be presented. In such a case, note that the application selection process can be integrated with the process of designating timers to each application, wherein if an application is not desired then its timer can be set to zero (e.g., 0 hrs, 0 mins). One or more scroll bars or other suitable navigation mechanisms can be provisioned to accommodate a large application selection.

Further note in the example sub-menu shown in FIG. 5e that the guardian can indicate whether a given application is preferred or not. A preferred application might be, for instance, one that the guardian feels has educational value or is otherwise appropriate for the intended child-user. In this example embodiment, note that if an application is designated as preferred, it can be used without a timing restriction and otherwise does not count against the allocated usage times. In some such embodiments, once the guardian checks the 'Preferred App?' box, that particular application timer can be grayed out or otherwise diminished from view, so that it is clear this application is not on a timer. The Kid Mode may further be configured to adjust total time for the sub-usage period in real-time, so the guardian can see the total time for that period increase (or decrease, as the case may be).

Further note in the example sub-menu shown in FIG. 5e that the guardian can enable communications via applications such as telephone, texting and email application, regardless of timer status, if so desired. For instance, in this specific example configuration, the guardian has selected 'Yes' on a pull-down menu associated with the configurable feature 'Allow communications to Parent/Guardian regardless of timer statuses?', and has specifically designated the phone and texting applications for such communications. The Kid Mode of this particular example embodiment is further configured to present the guardian with a link-based message of 'Click: Set Phone/Email/Text Access to configure communications', so that further configurations details with respect to the allowed communications via the designated phone and texting applications can be set. Example such details will be discussed in turn with reference to FIG. 5h.

Figure 5F:
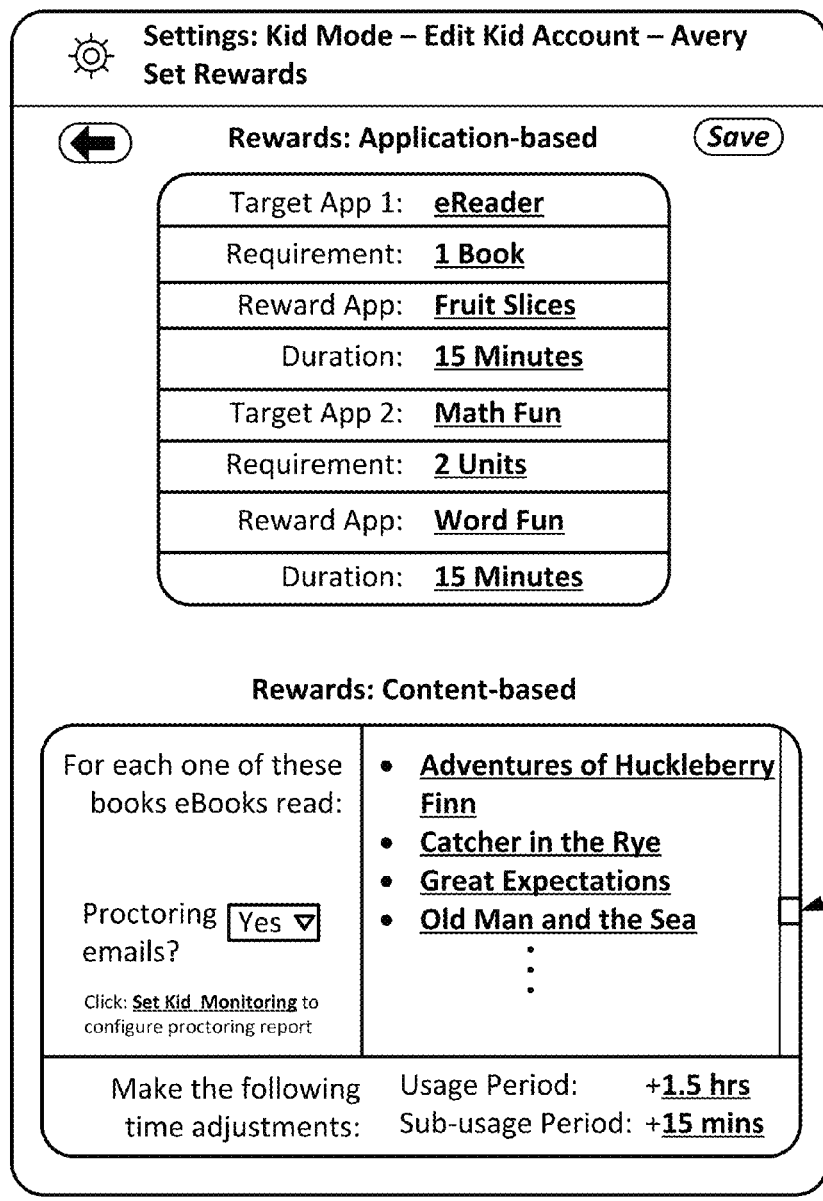
Figure 5G:

The next sub-menu option of FIG. 5d includes Set Rewards, which allows the guardian to designate a rewards program to encourage positive usage of the computing device. The reward may come in the form of, for instance, increased usage-times of an application that the child-user prefers when that child-user has amply used a parent-preferred application. Such rewards may be application-based and/or content-based. FIG. 5f show an example sub-menu that can be provided to the guardian in response to the Set Rewards menu option of FIG. 5d being selected. Assume these rewards are being set for Avery's user account. As can be seen in this example embodiment, the guardian can set both application-based and content-based rewards.

With respect to the application-based rewards of FIG. 5f, this example embodiment allows the guardian to specify one or more target applications and a corresponding reward application, as well as the requirement for obtaining the reward and the reward itself. For instance, in this example scenario, if Avery uses the eReader application to read one book, then upon completion of that book, she will receive access to the Fruit Slices application for 15 minutes. Likewise, if Avery uses the Math Fun application and completes two units, then upon completion of those two units, she will receive access to the Word Fun application for 15 minutes. As will be appreciated, the pairing of target and reward applications can be adjusted by Avery's guardian as desired as can the requirement for Avery to receive the reward and duration of the reward.

With respect to the content-based rewards of FIG. 5f, this example embodiment allows the guardian to specify one or more target content items for consumption (in this example case, eBooks), and a corresponding increment in usage-periods if that content is consumed. In the specific case shown, the Kid Mode is configured to give Avery an additional 1.5 hours in overall usage period (e.g., weekly) as well as an additional 15 minutes in the sub-usage period (e.g., daily). Further note in the example sub-menu shown in FIG. 5f that the guardian can enable proctoring reports, if so desired. For instance, in this specific example configuration, the guardian has selected 'Yes' on a pull-down menu associated with the configurable feature 'Proctoring emails?', so that reports can be periodically sent to the guardian indicating Avery's content usage stats and any other information that the guardian configured the Kid Mode to include in the proctoring report. To this end, note that the Kid Mode of this particular example embodiment is further configured to present the guardian with a link-based message of 'Click: Set Kid Mode Monitoring to configure proctoring report, so that further configurations details with respect to the proctoring report can be set. Example such details will be discussed in turn with reference to FIG. 5g.

The next sub-menu option of FIG. 5d includes Set Kid Monitoring, which allows the guardian to enable monitoring of the computing device with respect to the child-users usage and to designate content of the monitoring (or proctoring, as the case may be) report. In this example case, Lilly's guardian has enabled the Kid Monitoring function via selecting 'Yes' on a pull-down menu and has provided an email address for communicating the report generated by the Kid Mode. As can be further seen, the guardian has selected the following be included in the report: timer statistics (e.g., timer max amount and current timer value for each active time; timers at zero not reported), current applications (e.g., currently active applications being used by the child-user), application usage statistics (e.g., applications that have been used during the current usage-period and duration of use), and geolocation of device. In addition, the guardian has configured Kid Mode to generate and send the report every 60 minutes. Numerous variations will be apparent in light of this disclosure.

The next sub-menu option of FIG. 5d includes Sound, which allows the guardian to enable/disable the computing device's capability to generate audible sound. In one such example embodiment, for instance, the Kid Mode is configured to allow the guardian to disable one or more of the speaker(s) of the computing device while leaving the headphone jack active. Alternatively, all sound can be prevented (both speaker and headphone jack disabled), if so desired. Alternatively, sound can be selectively enabled on an application or content basis. For instance, an educational application that promotes word pronunciation and/or parent-approved music content can be associated with enabled sound. In a similar fashion, parent-disapproved applications and content can be associated with disabled sound. Numerous variations will be apparent in light of this disclosure.

The next sub-menu option of FIG. 5d includes Set Phone/Email/Text Access, which allows the guardian to set the child-user access to the various communication applications/functions of the computing device. As will be appreciated, such a configuration is particularly helpful where it is desirable to limit the persons with whom the child-user can communicate. As will be further appreciated, note that while the timers indicated in the Set Timers sub-menu can be used to limit the amount of time that such communication apps can be used by the child-user for general purposes, the Set Phone/Email/Text Access sub-menu can be used to allow access to those communication apps despite the value of any associated timers, so that communications to select people can be made by the child-user in emergency situations or when otherwise necessary. In this way, the communications access settings shown in the sub-menu of FIG. 5h can override the access settings shown in the sub-menu in FIG. 5e, in accordance with an embodiment.

In this example case, Lilly's parents have enabled Kid Mode to provide Lilly with limited access to the phone and texting applications. In particular, the parents have selected 'Yes' on a pull-down menu associated with the configurable feature 'Allow phone call to parent/guardian?'. In addition, the Kid Mode configuration UI has been used to upload images of Mom and Dad (e.g., Mom_Image-phone.jpeg and Dad_Image-phone.jpeg, each showing Lilly's mom and dad on the phone) via an 'Upload Phone Icon Images' feature. In addition, the corresponding telephone number for each uploaded phone icon image has been provided. As can be seen, the Kid Mode is configured to auto-dial these telephone numbers in response to Lilly tapping the corresponding phone icon.

Figure 5H:

A similar arrangement is provided with respect to the texting application, as further shown in FIG. 5h. In particular, the parents have selected 'Yes' on a pull-down menu associated with the configurable feature 'Allow Text to parent/guardian?'. In addition, the Kid Mode configuration UI has been used to upload images of Mom and Dad (e.g., Mom_Image-note.jpeg and Dad_Image-note.jpeg, each showing Lilly's mom and dad holding a note) via an 'Upload Text Icon Images' feature. In addition, the corresponding telephone number for each uploaded phone icon image has been provided. As can be seen, the Kid Mode is configured to auto-text these telephone numbers in response to Lilly tapping the corresponding texting icon. A similar arrangement is provided with respect to the email application, as further shown in FIG. 5h, which in this example case has been disabled by Lilly's parents. In additions, should the guardian wish to enable communication with other specific persons, this example embodiment provides a similar UI configuration screen in response to the guardian selecting the 'Click here to add capability to communicate with others' link-based message. In such cases, the user can enter the target person's personalized icon that is appropriate for the communication medium and a corresponding number (e.g., phone/text) or address (e.g., email). Numerous variations will be apparent in light of this disclosure. For instance, another embodiment may be similarly configured to allow the child-user to make video calls to an intended parent/guardian or other recipient.

The next sub-menu option of FIG. 5d includes Set Internet Access+Purchasing, which allows the guardian to enable/disable or otherwise limit the computing device's capability to access the Internet or to make purchases. In one such example embodiment, for instance, the Kid Mode is configured to not provide access to the browser application at all (e.g., by hiding or otherwise not presenting the icon for selection), thereby precluding any access to the Internet and any online purchases. In other embodiments, the Kid Mode is configured to provide access to the browser application, but is further configured to only allow a number of pre-established webpages to be accessed and restricting access to any other webpages. This restriction can be implemented, for example, at that domain level or at the URL level. In such cases, an approved list of websites or URLs can be provided by the guardian, and when the browser application is invoked to access a target website/URL, if that website/URL does not match one of the guardian-approved websites/URLs, then the Kid Mode causes the browser to present a default page indicating that access to the requested page is not allowed (or some variation of this, so that child-user is informed). In still other embodiments, the guardian-approved websites/URLs (if any) can be represented in an icon presented in the child-user's UI that, when selected by the child-user, automatically launches the browser application to access that guardian-approved website/URL. Any number of Internet access or restriction techniques can be used, as will be appreciated.

The next sub-menu option of FIG. 5d includes Set Remote Control, which allows the guardian to enable/disable remote access and control of the computing device. This remote control feature may be implemented, for instance, with a yes/no pull-down menu or other suitable UI mechanism. In any case, remote access may be used, for instance, to allow a guardian's computing device to remotely access child-user's device (e.g., to address a locked/seized application, or to reset a timer, or to assist the child-user in some way, or other such task when the guardian is remote to the child). Such a remote communication mode and link can be implemented using conventional or custom technology, such as the technology used in so-called desktop-sharing applications.

Figure 6:
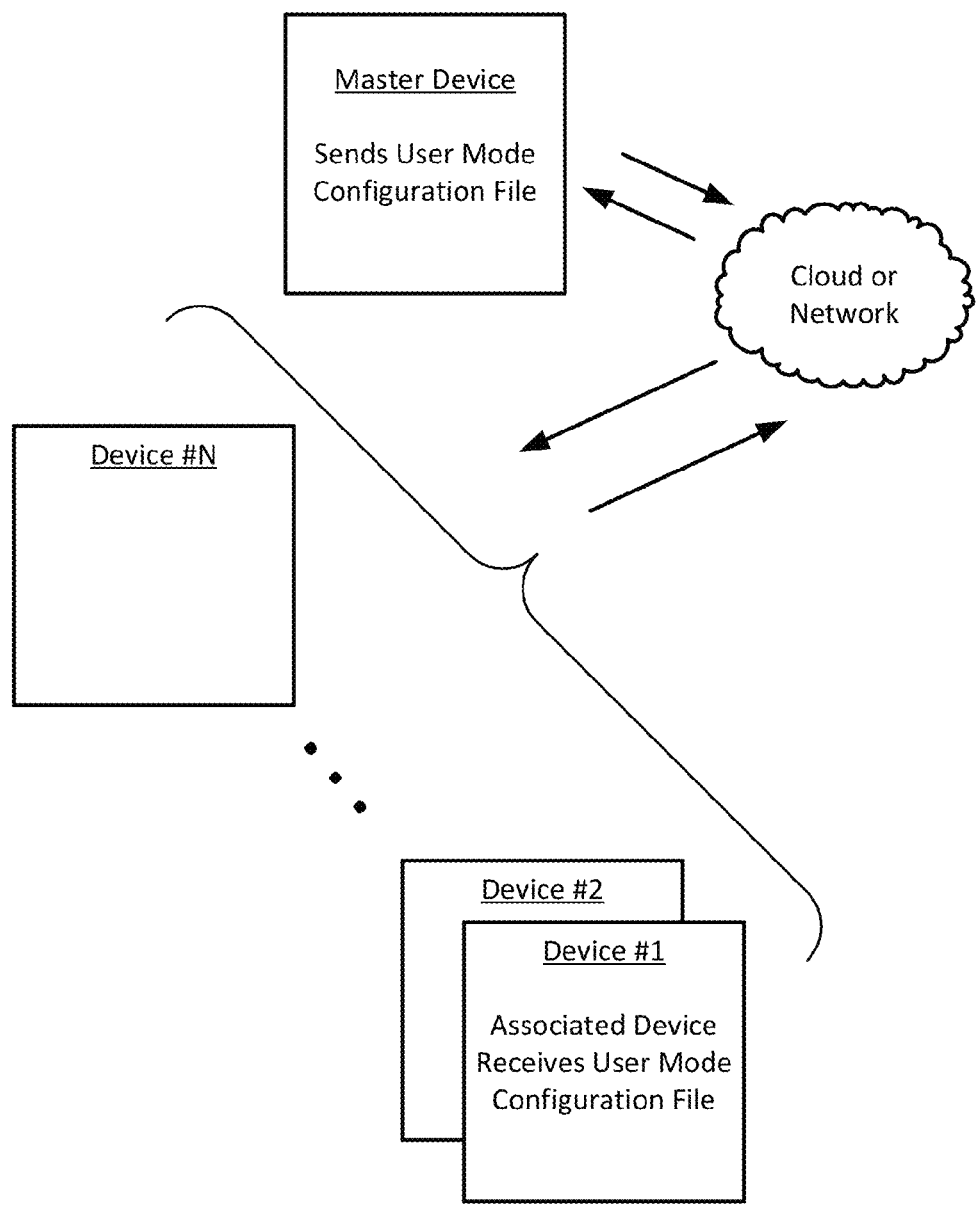
FIG. 6 illustrates a master computing device communicating a user mode configuration file to multiple devices, in accordance with an embodiment of the present invention.

The remote access feature of the Kid Mode may also be used in a group or classroom setting as previously explained. For example, FIG. 6 illustrates a master computing device communicating a user mode configuration file to multiple devices (device #s 1-N), in accordance with an embodiment of the present invention. The user mode configuration file can specify any number of features/functions (such as those shown in FIGS. 5a-h), and when the remote access is enabled, the Kid Mode of the receiving devices is further configured to execute or otherwise install the configuration file as if it was locally programmed (as discussed with reference to FIGS. 5a-h). In such some embodiments, the master device transmits a user mode configuration file across a wireless network to one or more computing devices each having an intended user, wherein the configuration file is used to configure each of the devices as desired. In one such example case, a kindergarten teacher can simultaneously enable a coloring/drawing application on the computing devices of each of her/his kindergartners, with each application being associated with a corresponding timer of 30 minutes. Alternatively, a second grade teacher can simultaneously administer a timed spelling test on the computing devices of each of her/his student, wherein user mode configuration file transmitted by the teacher effectively grants each student access to the spelling test and sets the time limit. Numerous other such scenarios will be apparent.

In still other embodiments, the master device may be a server computing system having one or more user mode configuration files, wherein the devices 1-N are configured to periodically access the server to receive updated configuration files (e.g., such as timers, applications, communication settings, and other such features as will be apparent in light of this disclosure). The access to the server can be automatically requested by the computing devices 1-N. Alternatively, access to the server can be automatically provided in response to a one of the computing devices 1-N (e.g., guardian computing device) making an update to one or more of the confirmation files associated with the other computing devices 1-N (e.g., the computing device of Lilly, Avery, and Jamie). In this way, the interaction between the parent and child-user devices can take place via a cloud service.

While FIGS. 5a-h include a number of user-configurable features, other embodiments may include hard-coded versions of such features, such that no user configuration (or less user configuration) is needed. For instance, in some embodiments, the contents of the monitoring report shown in the example embodiment of FIG. 5g can be hard-coded. To this end, the degree of hard-coding versus user-configurability of the various functionalities and features can vary from one embodiment to the next, and the claimed invention is not intended to be limited to any particular configuration scheme.

Numerous variations and embodiments will be apparent in light of this disclosure. One example embodiment of the present invention provides a computing device including a display for displaying content to a user, a touch sensitive surface for allowing user input, and a user interface. The user interface includes a kid mode configured to provide selective access to applications available on the device, wherein each application is associated with a timer that is settable to limit use of that application by a particular child-user. In some cases, the kid mode is configured to allow use of the device by multiple child-users, and each child-user is associated with an account on the device. In some such cases, the account specifies applications available to that particular child-user as well as corresponding application timers associated with those applications. In some cases, the kid mode is configured to allow use of the device by multiple child-users, and each child-user can be allocated access to applications different than applications allocated to the other child-users. In some cases, the kid mode is configured to allow use of the device by multiple child-users, and each child-user can be allocated usage times different from usage times allocated to the other child-users. In some cases, the kid mode is configured to track usage of a guardian-preferred application and/or guardian-preferred content by a given child-user, and to increase that child-user's use privileges with respect to the device as a reward for sufficiently using the educational application. In some such cases, the increase in use privileges is in the form of an increase in the child-user's access to a restricted application and/or restricted content. The increase in use privileges may also be in the form of an increase in the child-user's allocated usage time with respect to the device. In some cases, the kid mode is configured with a device timer settable to specify a usage-period that includes a plurality of sub-usage periods. In some such cases, the application timer is reset at the end of each sub-usage period and the device timer is reset at the end of the usage-period. In some cases, the applications available to the child-user on the device and the timers are user-configurable. In some cases, the kid mode is configured to provide icons that are sized based on an age range of the child-user. In some cases, the kid mode is configured to provide child-user access to communication applications by presenting to the child-user icons that include an image of a guardian of the child-user. In some such cases, the communication applications include at least one of a phone application, texting application, email application, or video phone application. In some cases, the kid mode can periodically report usage statistics associated with the child-user's use of the device. In some cases, a plurality of the devices can be included in a communication system that also includes another computing device configured to communicate with each of the plurality of devices, and to simultaneously engage the kid mode on each of those devices.

Another example embodiment of the present invention provides a computing device including a touch screen display for displaying content to a user and allowing user input, and a user interface. The user interface includes a kid mode configured to provide selective access to applications available on the device, wherein each application is associated with a timer that is settable to limit use of that application by a particular child-user. The kid mode in this example embodiment is configured to allow individual use of the device by multiple child-users. Each child-user is associated with an account on the device, and each account specifies applications available to that child-user as well as corresponding application timers associated with those applications (wherein the applications available to each child-user on the device and the timers are user-configurable). In some cases, the kid mode is configured to track usage of a guardian-preferred application and/or guardian-preferred content by a given child-user, and to increase that child-user's use privileges with respect to the device as a reward for sufficiently using an educational application. In some such cases, the increase in use privileges is in the form of at least one of an increase in the child-user's access to a restricted application and/or restricted content, or an increase in the child-user's allocated usage time with respect to the device. In some cases, the kid mode is configured with a device timer settable to specify a usage-period that includes a plurality of sub-usage periods, and the application timer is reset at the end of each sub-usage period and the device timer is reset at the end of the usage-period. In some cases, the kid mode is configured to provide icons that are sized based on age range of the child-user. In some cases, the kid mode is configured to provide child-user access to communication applications by presenting icons to the child-user that include an image of a guardian of the child-user. In some such cases, the communication applications include at least one of a phone application, texting application, email application, or video phone application. In some cases, the kid mode can periodically report usage statistics associated with the child-user's use of the device.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to provide (by a user interface of the device) selective access to applications available on the device (wherein each application is associated with a timer that is settable to limit use of that application by a particular user), and allow (by the user interface) individual use of the device by multiple users. In this example embodiment, each user is associated with an account on the device and each account specifies applications available to that user as well as corresponding application timers associated with those applications.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computing device comprising:
   a display for displaying content to a user;
   a touch sensitive surface for allowing user input; and
   a user interface including a kid mode configured to provide selective access to applications available on the device, wherein each application is associated with a timer that is settable to limit use of that application by a particular child-user, and wherein the kid mode is further configured with a device timer settable to specify a usage-period that includes a plurality of sub-usage periods, and the application timer is reset at the end of each sub-usage period and the device timer is reset at the end of the usage-period.

2. The device of claim 1 wherein the kid mode is further configured to allow use of the device by multiple child-users, and each child-user is associated with an account on the device, the account specifying applications available to that particular child-user as well as corresponding application timers associated with those applications.

3. The device of claim 1 wherein the kid mode is further configured to allow use of the device by multiple child-users, and each child-user can be allocated access to applications different than applications allocated to the other child-users.

4. The device of claim 1 wherein the kid mode is further configured to allow use of the device by multiple child-users, and each child-user can be allocated usage times different from usage times allocated to the other child-users.

5. The device of claim 1 wherein the kid mode is further configured to track usage of a guardian-preferred application and/or guardian-preferred content by a given child-user, and to increase that child-user's use privileges with respect to the device as a reward for sufficiently using the guardian-preferred application and/or guardian-preferred content.

6. The device of claim 5 wherein the increase in use privileges is in the form of at least one of an increase in the child-user's access to a restricted application, and an increase in the child-user's access to restricted content.

7. The device of claim 5 wherein the increase in use privileges is in the form of an increase in the child-user's allocated usage time with respect to the device.

8. The device of claim 1 wherein the usage-period comprises at least one week, and each sub-usage period comprises one day.

9. The device of claim 1 wherein the applications available to the child-user on the device and the timers are user-configurable.

10. The device of claim 1 wherein the kid mode is further configured to provide icons that are sized based on an age range of the child-user.

11. The device of claim 1 wherein the kid mode is further configured to provide child-user access to communication applications by presenting to the child-user icons that include an image of a guardian of the child-user, and wherein the communication applications include at least one of a phone application, texting application, email application, or video phone application.

12. The device of claim 1 wherein the kid mode can periodically report usage statistics associated with the child-user's use of the device.

13. The computing device of claim 1, wherein the device is included in a communication system, the communication system comprising:
a plurality of devices, each device of the plurality of devices comprising the computing device of claim 1; and
another computing device configured to communicate with each of the plurality of devices, and to simultaneously engage the kid mode on each of those devices.

14. A computing device comprising:
a touch screen display for displaying content to a user and allowing user input; and
a user interface including a kid mode configured to provide selective access to applications available on the device, wherein each application is associated with a timer that is settable to limit use of that application by a particular child-user, the kid mode being further configured to allow individual use of the device by multiple child-users;
wherein the kid mode is further configured to track usage of a guardian-preferred application and/or guardian-preferred content by a given child-user, and to increase that child-user's use privileges with respect to the device as a reward for sufficiently using the guardian-preferred application and/or guardian-preferred content, and wherein the increase in use privileges is in the form of at least one of an increase in the child-user's access to a restricted application, an increase in the child-user's access to restricted content, and an increase in the child-user's allocated usage time with respect to the device.

15. The device of claim 14 wherein the kid mode is further configured with a device timer settable to specify a usage-period that includes a plurality of sub-usage periods, and the application timer is reset at the end of each sub-usage period and the device timer is reset at the end of the usage-period.

16. The device of claim 14 wherein each child-user is associated with an account on the device, each account specifying applications available to that child-user as well as corresponding application timers associated with those applications, and wherein the applications available to each child-user on the device as well as the application and device timers are user-configurable.

17. The device of claim 14 wherein the kid mode is further configured to provide child-user access to communication applications by presenting icons to the child-user that include an image of a guardian of the child-user, and wherein the communication applications include at least one of a phone application, texting application, email application, or video phone application.

18. The device of claim 14 wherein the kid mode can periodically report usage statistics associated with the child-user's use of the device.

19. A computer program product comprising a plurality of instructions non-transiently encoded thereon to facilitate operation of an electronic device according to the following process, the process comprising:
provide, by a user interface of the device, selective access to applications available on the device, wherein each application is associated with a timer that is settable to limit use of that application by a particular user;
allow, by the user interface, individual use of the device by multiple users, each user associated with an account on the device, each account specifying applications available to that user as well as corresponding application timers associated with those applications; and
track usage of a guardian-preferred application and/or guardian-preferred content by a given child-user, and increasing that child-user's use privileges with respect to the device as a reward for sufficiently using the guardian-preferred application and/or guardian-preferred content, wherein the increase in use privileges is in the form of at least one of an increase in the child-user's access to a restricted application, an increase in the child-user's access to restricted content, and an increase in the child-user's allocated usage time with respect to the device.

* * * * *